United States Patent
Fukuoka et al.

(10) Patent No.: US 6,608,469 B2
(45) Date of Patent: Aug. 19, 2003

(54) DEVICE AND METHOD FOR CHARGING A SECONDARY BATTERY

(75) Inventors: Kazuhito Fukuoka, Kawasaki (JP); Nobuo Tanaka, Kawasaki (JP); Yoshiro Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/079,463

(22) Filed: Feb. 22, 2002

(65) Prior Publication Data

US 2003/0020434 A1 Jan. 30, 2003

(30) Foreign Application Priority Data

Jul. 30, 2001 (JP) ........................................ 2001-230329

(51) Int. Cl.⁷ ................................................ H02J 7/00
(52) U.S. Cl. ..................................................... 320/134
(58) Field of Search .................................. 320/134, 132, 320/149, DIG. 21; 324/426, 427, 433; 340/635, 636

(56) References Cited

U.S. PATENT DOCUMENTS 6,255,803 B1 * 7/2001 Ishihara et al. .............. 320/134
6,278,257 B1 * 8/2001 Takada et al. ............... 320/134

FOREIGN PATENT DOCUMENTS

| JP | 07137612 | * | 5/1995 |
| JP | 8-43505 |   | 2/1996 |
| JP | 10042482 | * | 7/1996 |
| JP | 9-17458 |   | 1/1997 |
| JP | 10255856 | * | 9/1998 |

* cited by examiner

Primary Examiner—Edward H. Tso
Assistant Examiner—Pia Tibbits
(74) Attorney, Agent, or Firm—Armstrong, Westerman & Hattori, LLP

(57) ABSTRACT

The device for charging a secondary battery, comprises: a measuring circuit for measuring the terminal voltage of the battery; a control circuit for controlling a charging current fed through the battery; and an abnormality determining portion which starts a preliminary charging of the battery (S2), finishes the charging (S4) when the voltage of the battery has reached a first threshold value which is decided based on the normal-state upper limit of the internal resistance and the current of the battery (S3), measures the open-circuit voltage of the battery after finishing the charging, determines that the battery is abnormal when the open-circuit voltage is less than a second threshold value (S5), determines that the battery is abnormal when the open-circuit voltage is larger than a third threshold value for detecting that the battery is abnormal (S5), and indicates that the battery is abnormal (S9).

12 Claims, 4 Drawing Sheets

DEVICE AND METHOD FOR CHARGING A SECONDARY BATTERY

BACKGROUND OF THE INVENTION

1. Field of the Invention

The present invention relates to a device and method for charging a secondary battery and, particularly, to a device and method for charging a secondary battery for detecting that the secondary battery is abnormal when charging the secondary battery.

2. Description of the Related Art

A secondary battery is generally a battery which can store power and can supply a direct current to the outside, as necessary, after repeated charges and discharges, and is used as a memory backup for a portable electronics device or computer such as a laptop personal computer, etc. It is known to use, for example, a lithium-ion battery as a secondary battery. A conventional charging device for a secondary battery performs a preliminary charging before a boost charging, and determines that the battery is abnormal when the open-circuit voltage of the battery has not reached a threshold value within a predetermined time from the start of the charging, and then indicates that the battery is abnormal with a LED without performing the boost charging, and determines that the battery is normal when the open-circuit voltage of the battery has reached the threshold value or more within the predetermined time from the start of the charging, and then performs the boost charging. For this purpose, the charging device checks the open-circuit voltage of the battery, repeating the preliminary charging of the battery and the opening of the receiving end of the battery periodically within the predetermined time.

FIG. 4 is a flowchart of the current control of the conventional charging device. When the charging device charges a secondary battery (simply called a "battery" hereinafter), it controls the charging current so as to perform the preliminary charging at first, and then performs the boost charging after determining that the battery is not abnormal.

At step S101, when the AC power is supplied to the charging device, the preliminary charging is started, and a preliminary charging current of, for example, 100 mA is fed to the battery.

At step S102, it is determined whether a predetermined time of, for example, 10 seconds has passed since the preliminary charging started, and in case of YES the process goes to step S103, but in case of NO the process returns to step S101 to continue the preliminary charging.

At step S103, the terminal of the battery is opened to stop the preliminary charging, and the open state terminal voltage of the battery is measured.

A step S104, it is determined whether the predetermined time of, for example, 1 second has passed since the preliminary charging stopped at step S103, and in case of YES the process goes to step S105, but in case of NO the process returns to step S103 to continue to stop the preliminary charging.

At step S105, it is determined whether the open-circuit voltage measured at step S104 is larger than a predetermined threshold value, and in case of YES the process goes to step S108, but in case of NO the process goes to step S106.

At step S106, it is determined whether the predetermined charging time of, for example, 1 hour has passed since the charging started, and in case of YES the process goes to step S107, but in case of NO the process returns to step S101 to start the preliminary charging again.

At step S107, the LED is lit to indicate that the battery is abnormal, and the charging is finished.

At step S108, the boost charging is performed.

At step S109, it is determined whether the terminal voltage during the boost charging has reached the predetermined voltage, and in case of YES the charging is finished, but in case of NO the process returns to step S108 to continue the boost charging.

However, there is a problem, with the conventional charging device for a secondary battery, in that the charging device checks the open-circuit voltage of the battery, when charging an abnormal secondary battery, repeating the preliminary charging of the battery and the opening of the circuit to the battery periodically within a predetermined time (for example, one hour), but it may happen that the charging device does not detect that the battery is abnormal because the open-circuit voltage does not exceed the threshold value during the predetermined time, and only after it has performed the preliminary charging for a long time over the predetermined time, can it detect the abnormal battery.

In addition, there is a problem, with the conventional device for charging a secondary battery, in that as an abnormal secondary battery may have an open circuit voltage which is over the threshold value, the charging device is not able to surely detect an abnormality of a secondary battery.

SUMMARY OF THE INVENTION

It is therefore an object of the present invention to provide a device for charging a secondary battery, which is able to detect an abnormality of a secondary battery exactly and surely in a short time.

In order to achieve the above object, a device for charging a secondary battery according to the present invention comprises: a voltage measuring circuit for measuring the terminal voltage of said secondary battery; a current control circuit for controlling a charging current fed through said secondary battery; and an abnormality determining portion which starts charging said secondary battery, finishes said charging when said terminal voltage has reached a first threshold value which is decided based on the normal-state upper limit of the internal resistance and the charging current of said secondary battery, measures the open-circuit voltage of said secondary battery after finishing said charging, and determines that said secondary battery is abnormal when said open-circuit voltage is less than a second threshold value.

In the above device for charging a secondary battery according to the present invention, said abnormality determining portion determines that said secondary battery is abnormal when said open-circuit voltage is larger than a third threshold value.

In the above device for charging a secondary battery according to the present invention, said abnormality determining portion obtains said internal resistance of said secondary battery based on a first terminal voltage of said secondary battery while being charged and a second terminal voltage of said secondary battery whose terminal is opened after finishing said charging, and determines that said secondary battery is abnormal when said internal resistance is out of an allowable range.

In the above device for charging a secondary battery according to the present invention, said current control circuit performs a boost charging of said secondary battery when said abnormality determining portion has determined that said secondary battery is normal.

In order to achieve the above object, a method for charging a secondary battery, using a voltage measuring circuit for measuring the terminal voltage of said secondary battery, a current control circuit for controlling a charging current fed through said secondary battery, and an abnormality determining portion, comprising steps of: starting the charging of said secondary battery; finishing said charging when said terminal voltage has reached to a first threshold value which is decided based on the normal-state upper limit of the internal resistance and the charging current of said secondary battery; measuring the open-circuit voltage of said secondary battery after finishing said charging; and determining that said secondary battery is abnormal when said open-circuit voltage is less than a second threshold value.

In the above method for charging a secondary battery according to the present invention, the method further comprises a step of determining that said secondary battery is abnormal when said open-circuit voltage is larger than a third threshold value.

In the above method for charging a secondary battery according to the present invention, the method further comprises a step at which said abnormality determining portion obtains said internal resistance of said secondary battery based on a first terminal voltage of said secondary battery being charged and a second terminal voltage of said secondary battery whose terminal is opened after finishing the charging, and determines that said secondary battery is abnormal when said internal resistance is out of an allowable range.

In the above method for charging a secondary battery according to the present invention, the method further comprises a step at which said current control circuit performs a boost charging of said secondary battery when said abnormality determining portion has determined that said secondary battery is normal.

In the above method for charging a secondary battery according to the present invention, the method further comprises a step of indicating that said secondary battery is abnormal when it has been determined that said secondary battery is abnormal.

In the above device or method for charging a secondary battery according to the present invention, setting a first threshold value for finishing the charging of the battery, which is decided based on the normal-state upper limit of the internal resistance and the charging current of the battery, allows the terminal voltage of the battery being charged to be measured without opening the terminal of the battery, and allows the measured terminal voltage to be compared with the first threshold value, and thereby a complicated control, such as repeating the charging and opening the circuit, is not required.

Furthermore, when the terminal voltage of the battery being charged has reached to the first threshold value, and the terminal voltage of the battery whose terminal is opened after finishing the charging is less than a second threshold value for determining that the secondary battery is abnormal, the internal resistance of the battery may be assumed to be at the normal state upper limit or more, and thereby it may be determined that the battery is abnormal.

Furthermore, by obtaining the internal resistance of the battery based on the terminal voltage of the battery being charged and the terminal voltage of the battery whose terminal is opened after finishing the charging, and by determining whether the internal resistance is in the normal state allowable range of the battery, it may be assumed that the internal resistance is larger than the normal state upper limit when the open-circuit voltage is less than the second threshold value for determining that the battery is abnormal, while it may be assumed that the internal resistance is less than the normal state lower limit when the open-circuit voltage is larger than a third threshold value for detecting that the battery is abnormal, and thereby it may be determined that the secondary battery is abnormal, and an abnormal secondary battery may be surely detected.

DESCRIPTION OF THE PREFERRED EMBODIMENTS

Figure 1:
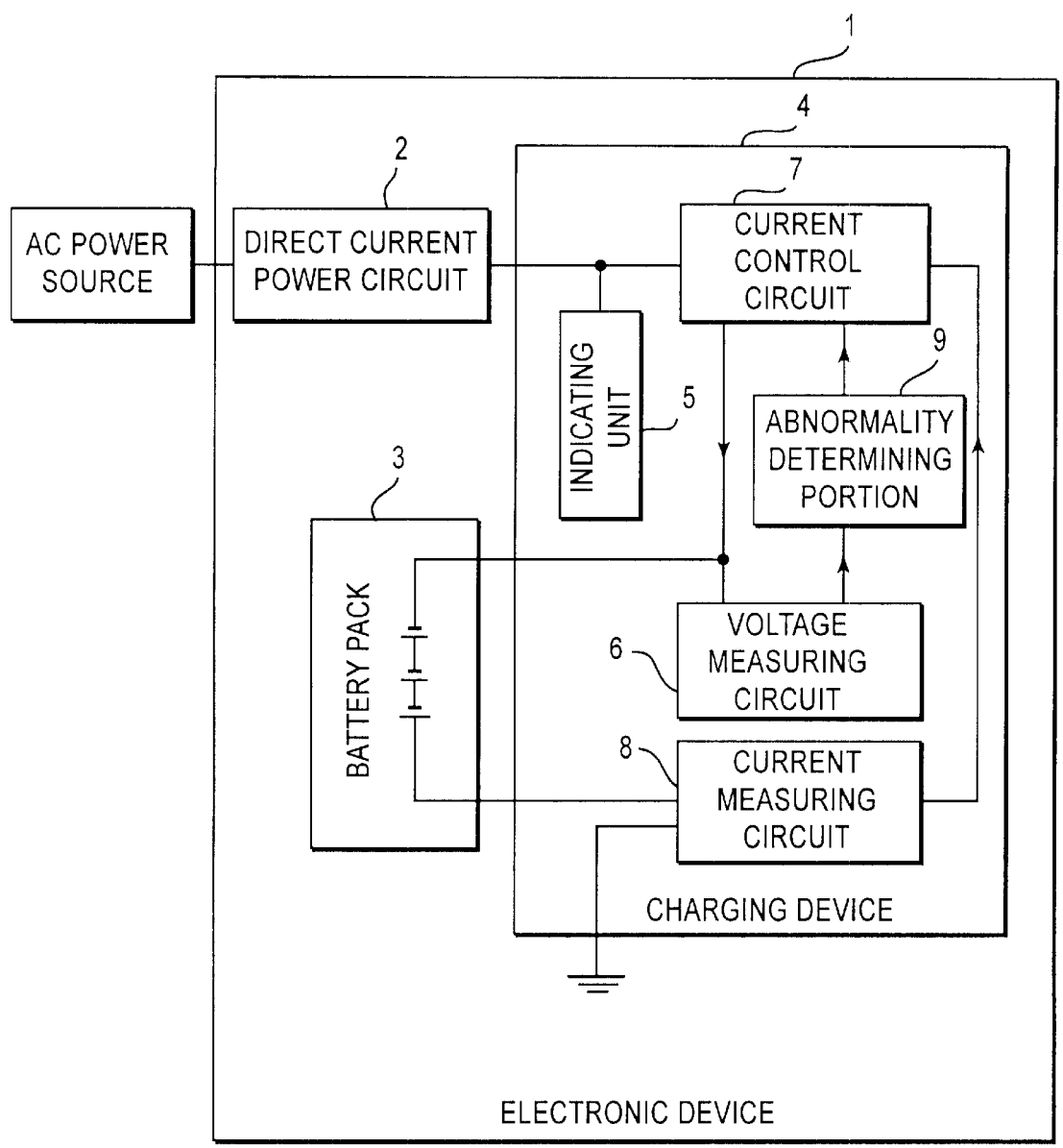
FIG. 1 is a schematic diagram of a charging device for charging a secondary battery according to the present invention.

FIG. 1 is a schematic diagram of a charging device for charging a secondary battery according to the present invention.

In FIG. 1, the electronic device 1 comprises a direct current power circuit 2, a battery pack 3, and a charging device 4. The direct current power circuit 2 is called, for example, an AC adapter, and is connected to an alternating current power source to supply a direct current power to the charging device 4. The battery pack 3 accommodates a secondary battery consisting of a plurality of battery cells in series, and a protection circuit (not shown) for protecting the battery against over current and over discharging. The charging device 4 comprises an indicating unit 5 consisting of, for example, an LED, etc., a voltage measuring circuit 6 for measuring the terminal voltage of the battery 3, a current control circuit 7 for controlling the charging current to the battery 3 according to the measured terminal voltage, and a current measuring circuit 8 for measuring the charging current to the battery 3. The charge device 4 further comprises abnormality determining portion 9.

Figure 2:
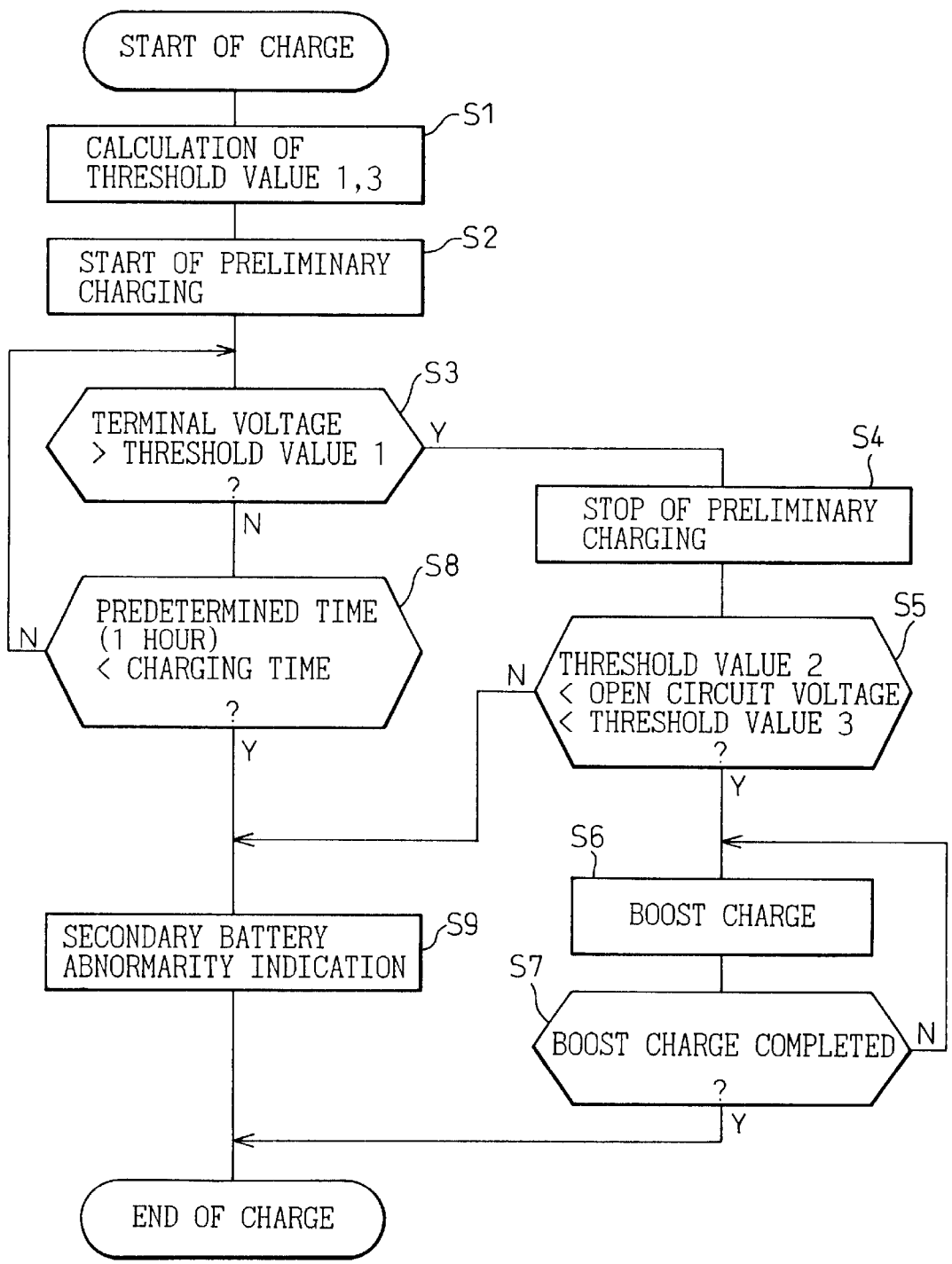
FIG. 2 is a flow chart of the current control of the charging device shown in FIG. 1.
Figure 3A:
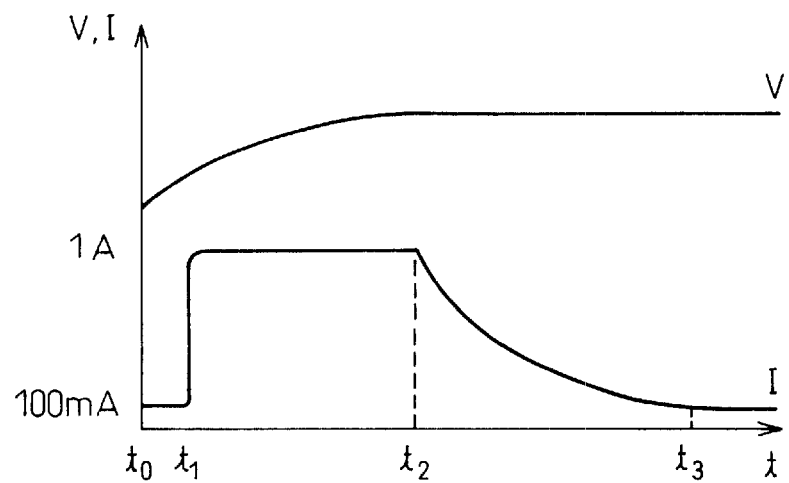
FIG. 3A shows a variation in voltage and current of a secondary battery being charged in case that the secondary battery is normal.
Figure 3B:
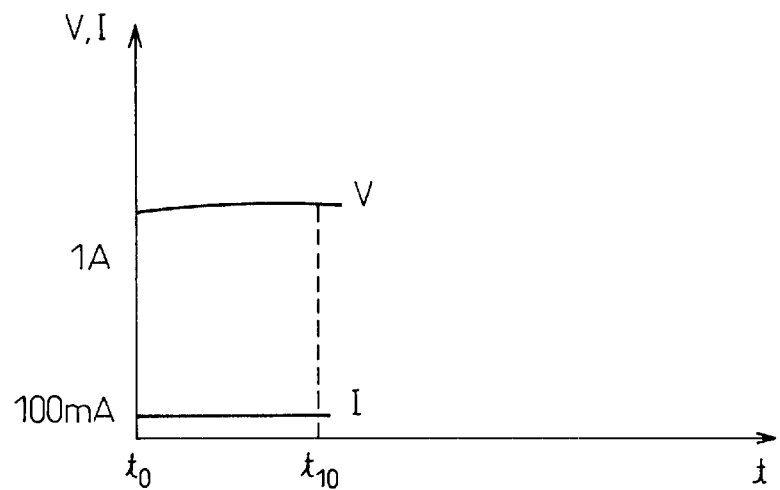
FIG. 3B shows a variation in voltage and current a secondary battery being charged in case that the battery is abnormal.
Figure 4:
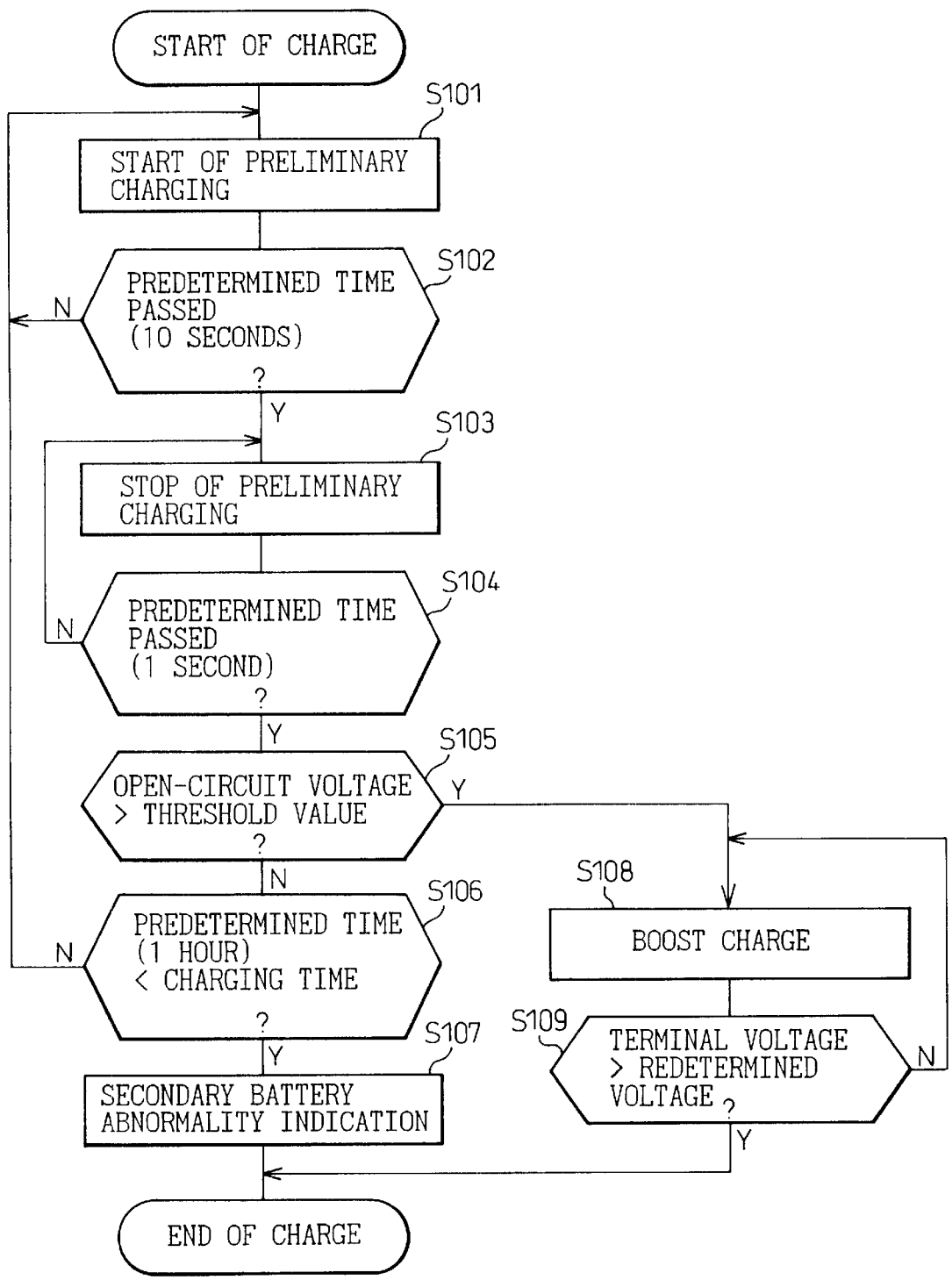
FIG. 4 is a flow chart of the current control of a conventional charging device.

FIG. 2 is a flow chart of the current control of the charging device shown in FIG. 1. FIGS. 3A and 3B show variations in voltage and current of a secondary battery being charged, and FIG. 3A shows a variation in voltage and current in case that the secondary battery is normal, and FIG. 3B shows a variation in voltage and current in case that the secondary battery is abnormal.

When the charging device 4 charges the battery 3 under control of the current control circuit 7, it performs at first a preliminary charging of the battery 3, and checks that the battery 3 is not in an abnormal condition, and then performs a boost charging of the battery 3. This control is described below referring to FIGS. 1, 2, 3A and 3B.

At step S1, when the AC power is supplied to the direct current power circuit 2 at the time t0 (see FIG. 3a), at first a threshold value 1 (V1) and a threshold value 3 (V3) are calculated.

The threshold value 1 (V1) is given by the following equation (1) using the normal state upper limit (Rih) of the internal resistance of the secondary battery, the charging current (I), and a threshold value 2 (V2) for detecting that the secondary battery is abnormal, which is defined by the characteristic of the secondary battery.

$$V1 = Rih \times I + V2 \quad (1)$$

The threshold value 3 is given by the following equation (2) using the normal state lower limit (Ril) of the internal resistance of the secondary battery, the charging current (I), and the threshold value 1 (V1).

$$V3 = V1 - Ril \times I \quad (2)$$

At step S2, the current control circuit 7 starts the preliminary charging to feed the preliminary charging current of, for example, 100 A to the battery 3.

At step S3, the terminal voltage of the battery 3 is measured, and then it is determined whether the measured voltage is larger than the threshold value 1 (V1), and in case of YES (time t1 (see FIG. 3A)) the process goes to step S4, but in case of NO the process goes to step S8.

At step S4, the terminal of the battery 3 is opened to stop the preliminary charging, and then the terminal voltage of the battery 3 is measured.

At step S5, it is determined whether the open-circuit voltage measured at step S4 is between the threshold value 2 and the threshold value 3, and in case of YES the process goes to step S6, but in case of NO the process goes to step S9.

At step S6, the boost charging is performed to feed a charging current of 1 A to the battery 3.

At step S7, the charging current is reduced gradually from the time (time t2 (see FIG. 3A)) when the terminal voltage reaches the predetermined voltage, and then it is determined whether the charging current measured by the current measuring circuit 8 has come down to the predetermined current of, for example, 100 mA, that is, whether the boost charging has been completed, and in case of YES (time t3 (see FIG. 3A)) the control signal for stopping the boost charging is sent to the current control circuit 7 to finish the boost charging, but in case of NO the process returns to step S6 to continue the boost charging.

At step S8, it is determined whether the predetermined time of, for example, 1 hour (time t10 (see FIG. 3B)) has passed since the preliminary charging started, and in case of YES the process goes to step S9, but in case of NO the process returns to step S3.

At step S9, the LED 5 is lit to indicate that the battery 3 is abnormal, and the charging is finished.

In the above control method, as the terminal voltage of the battery being charged is usually higher than the open-circuit voltage of the battery to which the charging is stopped, by the internal resistance×charging current, the threshold value 1 (V1) may be obtained by defining the upper limit of the normal state internal resistance of the secondary battery based on the characteristic of the secondary battery. Thus, the timing of finishing the preliminary charging may be detected only by watching whether the terminal voltage of the battery being charged has become larger than the threshold 1 at step S3.

Furthermore, it may be detected whether the battery is an abnormal battery, the open-circuit voltage of which is less than the threshold value 2 (V2), by measuring the terminal voltage (open-circuit voltage) after finishing the preliminary charging at step S4, and by comparing the open-circuit voltage with the threshold value 2 (V2). In this case, as the internal resistance of the secondary battery causes the voltage to become larger than the normal state upper limit V1, it is not required to further perform the preliminary charging until the open-circuit voltage becomes larger than V2.

Furthermore, at step S5, it may be determined whether the internal resistance of the secondary battery is less than the normal state lower limit by comparing the terminal voltage (open-circuit voltage) after finishing the preliminary charging with the threshold value 3 (V3) and, thus, an abnormal battery may be detected more exactly.

As described above, according to the present invention, an abnormality of a secondary battery to which preliminary charging is being performed may be detected easily, and an abnormality of a secondary battery may be detected exactly, by only modifying the control of the current control circuit of a conventional charging device.

What is claimed is:

1. A device for charging a secondary battery, comprising:
   a voltage measuring circuit measuring a terminal voltage of said secondary battery;
   a current control circuit controlling a charging current fed through said secondary battery; and
   an abnormality determining portion which:
   starts charging said secondary battery,
   compares said terminal voltage with a first threshold value which is decided based on a predetermined normal-state upper limit of an internal resistance and the charging current of said secondary battery,
   finishes said charging when said terminal voltage has reached said first threshold value,
   measures the open-circuit voltage of said secondary battery after finishing said charging, and
   determines that said secondary battery is abnormal when said open-circuit voltage is less than a second threshold value.

2. The device for charging a secondary battery of claim 1, wherein said abnormality determining portion determines that said secondary battery is abnormal when said open-circuit voltage is larger than a third threshold value determined based on said first threshold value, a predetermined normal-state lower limit of an internal resistance and the charging current of said secondary battery.

3. The device for charging a secondary battery of claim 1 or claim 2, wherein said abnormality determining portion obtains an internal resistance of said secondary battery based on a first terminal voltage of said secondary battery being charged and a second terminal voltage of said secondary battery whose terminal is opened after finishing said charging, and determines that said secondary battery is abnormal when said internal resistance is out of an allowable range.

4. The device for charging a secondary battery, of claim 1 or 2, wherein said current control circuit performs a boost charging of said secondary battery when said abnormality determining portion has determined that said secondary battery is normal.

5. The device for charging a secondary battery of claim 1 or 2, further comprising an indicating unit for indicating that said secondary battery is abnormal when said abnormality determining portion has determined that said secondary battery is abnormal.

6. A method for charging a secondary battery, using a voltage measuring circuit for measuring a terminal voltage of said secondary battery, a current control circuit for controlling a charging current fed through said secondary battery, and an abnormality determining portion, and comprising steps of:
   starting the charging of said secondary battery;

comparing said terminal voltage with a first threshold value which is decided based on a predetermined normal-state upper limit of the internal resistance and the charging current of said secondary battery;

finishing said charging when said terminal voltage has reached said first threshold value;

measuring an open-circuit voltage of said secondary battery after finishing said charging; and determining that said secondary battery is abnormal when said open-circuit voltage is less than a second threshold value.

7. The method for charging a secondary battery of claim 6, further comprising a step of determining that said secondary battery is abnormal when said open-circuit voltage is larger than a third threshold value determined based on said first threshold value, a predetermined normal-state lower limit of an internal resistance and the charging current of said secondary battery.

8. The method for charging a secondary battery, of claim 6 or claim 7, further comprising a step at which said abnormality determining portion obtains an internal resistance of said secondary battery based on a first terminal voltage of said secondary battery being charged and a second terminal voltage of said secondary battery whose terminal is opened after finishing the charging, and determines that said secondary battery is abnormal when said internal resistance is out of an allowable range.

9. The method for charging a secondary battery, of claim 6 or 7, further comprising a step at which said current control circuit performs a boost charging of said secondary battery when said abnormality determining portion has determined that said secondary battery is normal.

10. The method for charging a secondary battery of claim 6 or 7, further comprising a step of indicating that said secondary battery is abnormal when it has been determined that said secondary battery is abnormal.

11. A device for charging a secondary battery, comprising:
    a voltage measuring circuit measuring a terminal voltage of said secondary battery;
    a current control circuit controlling a charging current fed to said secondary battery; and
    an abnormality determining portion which:
        starts a preliminary charging of said secondary battery, finishes said preliminary charging when
        compares said terminal voltage with a first threshold value which is decided based on a predetermined normal-state upper limit of the internal resistance and the charging current of said secondary battery,
        finishes said preliminary charging when said terminal voltage has reached said first threshold value;
        measures the open-circuit voltage of said secondary battery after finishing said preliminary charging, and
        determines that said secondary battery is abnormal when said open-circuit voltage is less than a second threshold value.

12. A method, for charging a secondary battery, using a voltage measuring circuit for measuring a terminal voltage of said secondary battery, a current control circuit for controlling a charging current fed through said secondary battery, and an abnormality determining portion, and comprising steps of:

starting the preliminary charging of said secondary battery;

comparing said terminal voltage with a first threshold value which is decided based on a predetermined normal-state upper limit of the internal resistance and the charging current of said secondary battery;

finishing said preliminary charging when said terminal voltage has reached said first threshold value;

measuring a open-circuit voltage of said secondary battery after finishing said preliminary charging; and determining that said secondary battery is abnormal when said open-circuit voltage is less than a second threshold value.

* * * * *